United States Patent
Robbins et al.

[15] 3,663,139
[45] May 16, 1972

[54] APPARATUS FOR MOLDING PLASTIC ARTICLES

[72] Inventors: John E. Robbins; William F. Willbond; Kingsley J. Tutt; Dennis S. Hall; Raymond Hanson, all of Leicester, England

[73] Assignee: USM Corporation, Flemington, N.J.

[22] Filed: Apr. 20, 1970

[21] Appl. No.: 29,879

[52] U.S. Cl..............................425/147, 141/157, 425/159, 425/169, 425/119, 425/242, 425/817, 425/401, 425/449
[51] Int. Cl.......................................B29f 1/10, A43d 35/00
[58] Field of Search..........18/30 CM, 30 CK, 30 CV, 30 CR, 18/30 CS, 2 HA, 5 BC, 12 DR, 12 F, 20 R, 20 S, 20 H; 141/157, 153

[56] References Cited

UNITED STATES PATENTS

| 3,014,242 | 12/1961 | Baker et al | 18/30 CR UX |
| 3,306,964 | 2/1967 | Miller, Jr. | 18/30 CR X |
| 3,523,993 | 8/1970 | Hawkins | 18/20 H UX |
| 2,028,044 | 1/1936 | Brousseau et al | 18/2 HA UX |
| 2,541,592 | 2/1951 | Lietaert | 18/30 CR UX |
| 2,922,444 | 1/1960 | Minard | 141/157 X |
| 3,025,568 | 3/1962 | Hardy | 18/30 CR |
| 3,243,848 | 4/1966 | Miller et al | 18/2 HA X |

*Primary Examiner*—Robert L. Spicer, Jr.
*Attorney*—Richard A. Wise, Richard B. Megley and Vincent A. White

[57] ABSTRACT

Apparatus for molding articles of plastic material having a signal device on a mold indicating its volume and controlling the volume of material injected into the mold. The volume of material injected is further variable to vary the density of articles formed in the mold.

8 Claims, 12 Drawing Figures

Fig.1

Inventors
John E. Robbins
William F. Willbond
Kingsley J. Tutt
Dennis S. Hall
Raymond Hanson
By their Attorney
Vincent A. White

APPARATUS FOR MOLDING PLASTIC ARTICLES

BACKGROUND OF THE INVENTION

The production of plastic articles by an injection moulding process is common. In particular, it is known in the manufacture of shoes to apply shoe bottoms of synthetic plastic material either adhesively as a unit or by moulding directly on a shoe upper assembly. It has become increasingly popular to apply shoe bottoms of a so-called "foam" material in which the density of the material is controlled for specific characteristics.

Such plastic materials usually involve mixing two or more compositions which react in a partially filled mould and expand to fill the mould cavity. However, it is important that the expansion of the mixed material be closely controlled to obtain uniform characteristics. Thus, it is essential that the volume of the mixed compositions injected in the mould cavity be closely predetermined according to the volume of the cavity. Devices have been used in the past to determine when a mould was filled and thus stop injection of material. However, when the mould is to be filled only partially and in precise volumes to control expansion such devices cannot be used. If all mould cavities had the same volume it would be sufficient to control only the output of the material injecting mechanism. This is not possible, however, in the manufacture of different articles and especially shoes where each shoe bottom may be of a different size or shape, differing substantially in volume.

Accordingly, it is an object of the present invention to control the volume of plastic material injected into moulds which may vary substantially in cavity volume. To this end, each mould to be injected with material is provided with a signal device which has a characteristic related to the volume of the mould cavity. The mechanism for injecting plastic material into the mould includes means controlled by the signal device for varying the volume of the material injected.

According to one feature of the invention a plurality of moulds are each provided with individual signal devices. The injecting mechanism is adapted to be moved from mould to mould to inject a particular volume of plastic material in each mould depending on the cavity volume indicated by the signal devices. Another feature provides means for adjusting the volume of injected material independent of but cooperating with the control exercised by the signal device to vary the density of the material after expansion.

The above and other of the various objects and several features of this invention will now be described with reference to the accompanying drawings. It should be understood that the illustrative machine and the illustrative mould stations are described to illustrate the invention by way of example only, and not by way of limitation thereof.

The illustrative machine is particularly adapted for but not limited to moulding of shoe bottoms of a polyurethane foam moulding material. A typical material maybe provided by mixing together a first constituent composition comprising compounds providing active hydrogens and a second constituent composition comprising reactive isocyanate groups. Gas or vapor for forming cells in the molded product maybe generated either by reaction of a portion of the isocyanate with water in the mix or by incorporating a volatile liquid or a gas in the reactive mixture.

Figure 1:
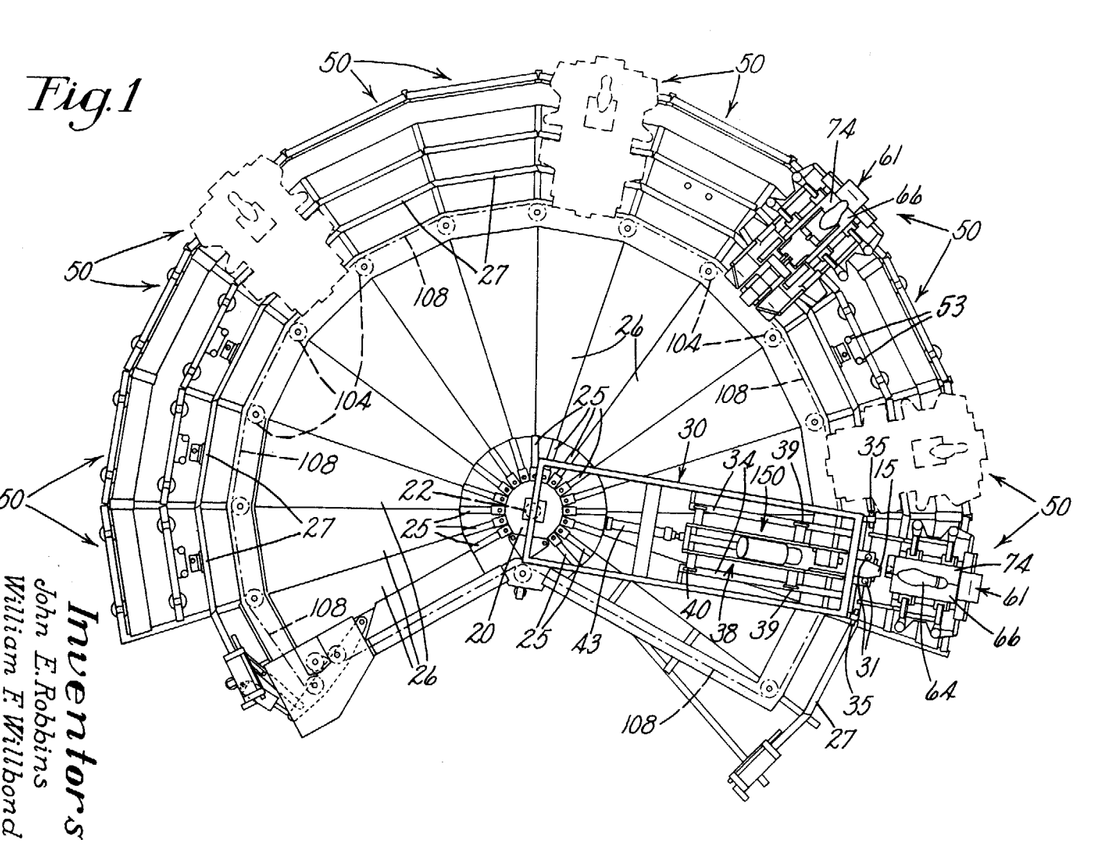
FIG. 1 is a plan view of the illustrative machine.

The machine has twelve mould stations 50 and an injection mechanism 150 (FIGS. 1 and 2) only two complete stations being shown in full lines and three in broken lines in FIG. 1.

Figure 2:
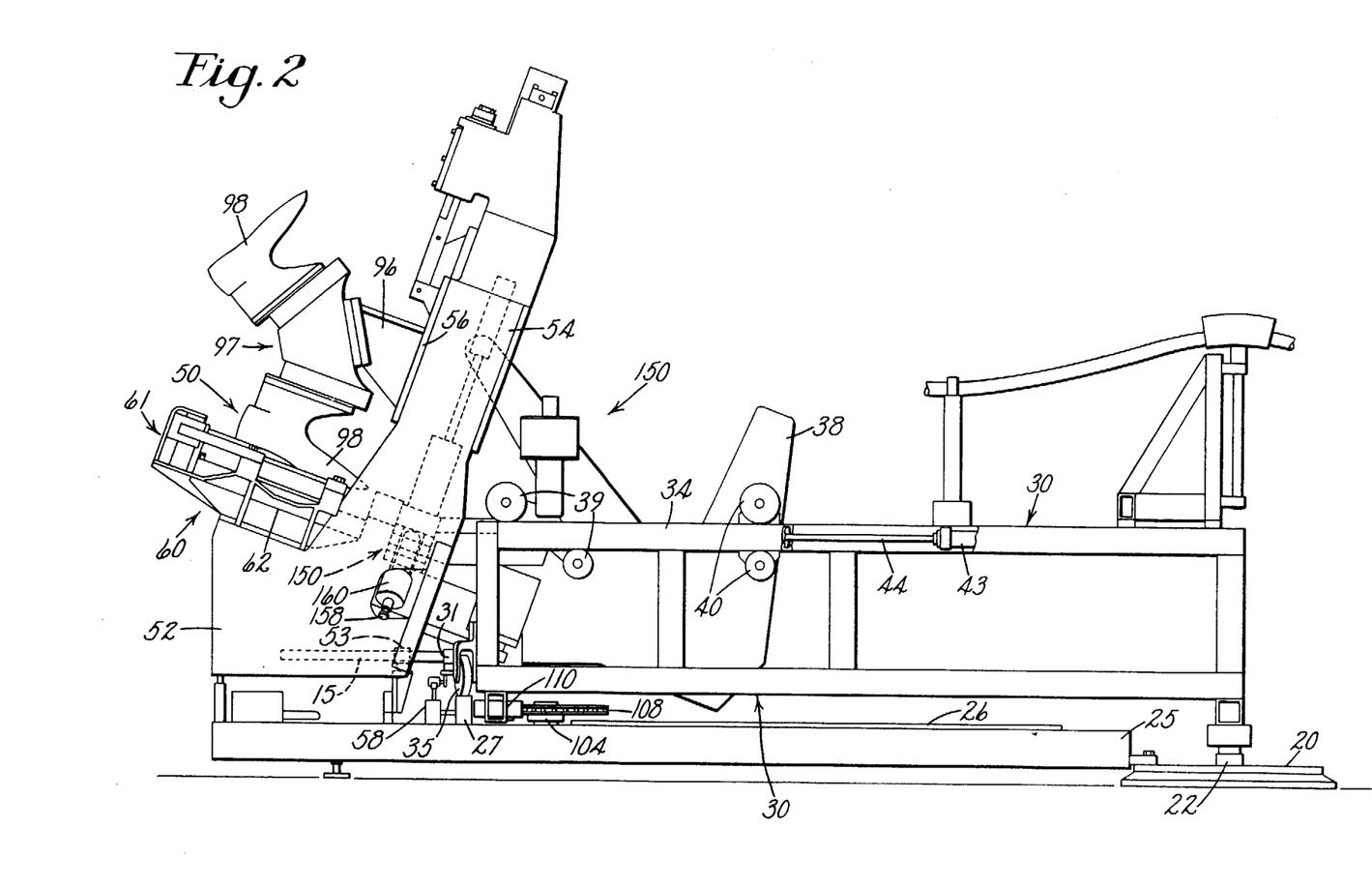
FIG. 2 is a side view of a portion of the illustrative machine showing an illustrative mould station thereof.
Figure 6:
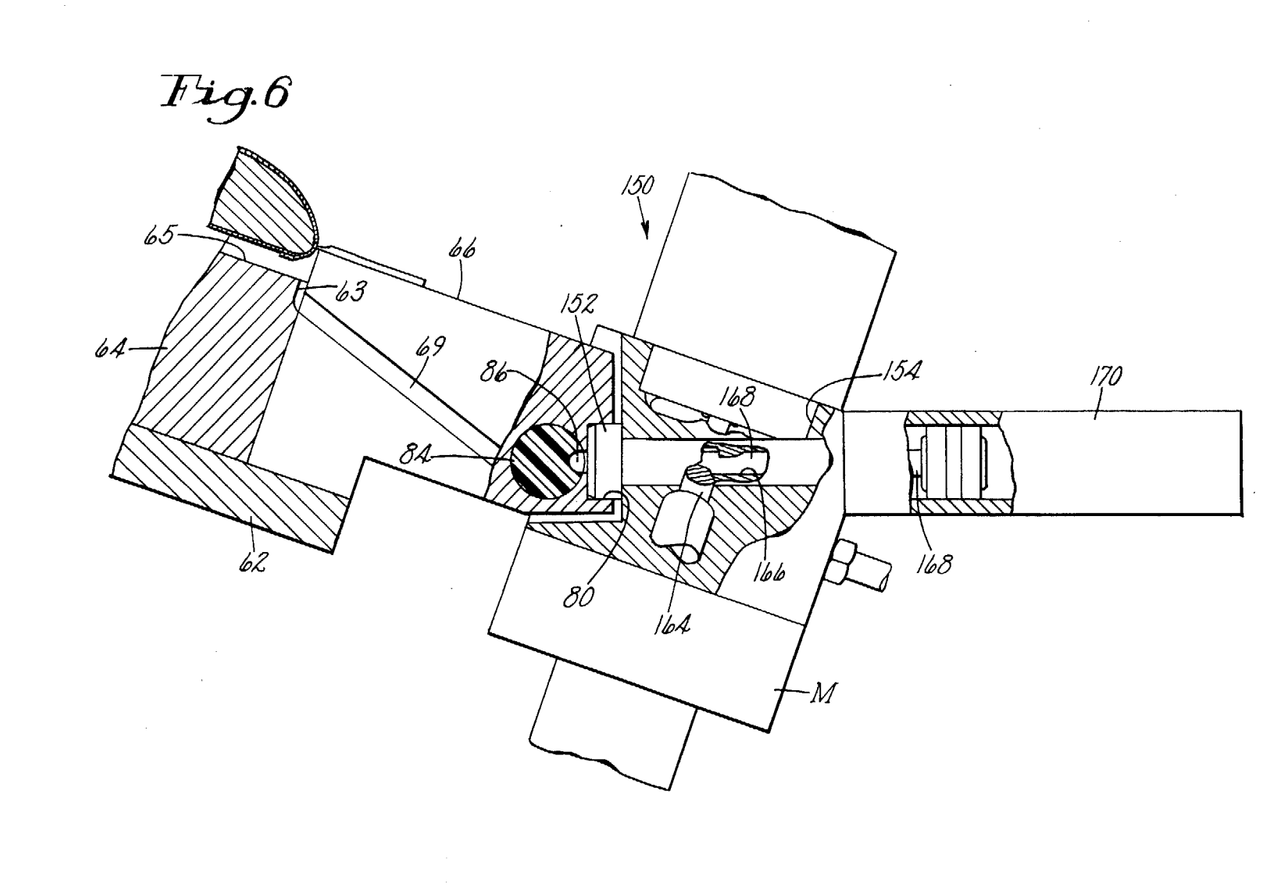
FIG. 6 is a side elevation partly in section showing an outlet nozzle of the injection mechanism in engagement with an inlet of a mould assembly.
Figure 10:
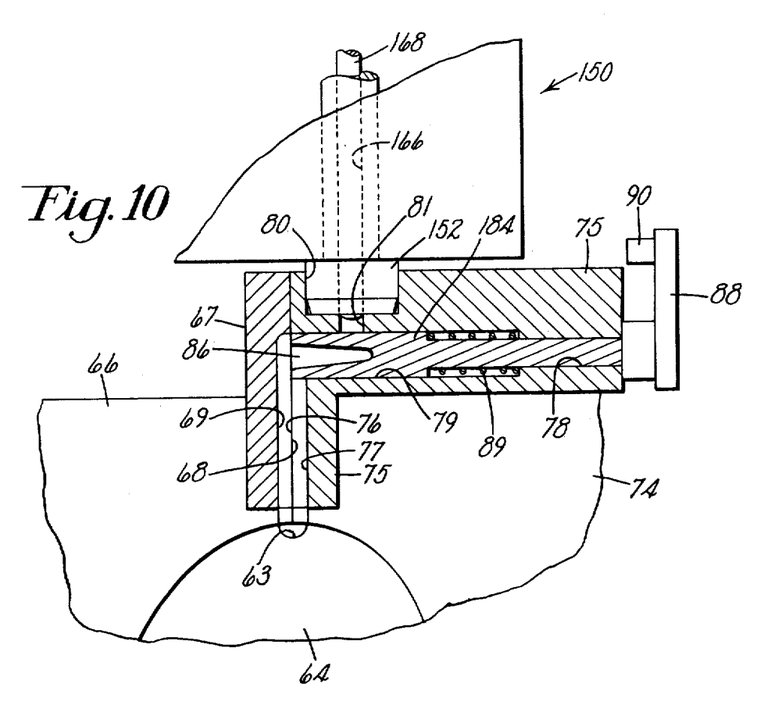
FIG. 10 is a plan view partly in section showing a valve member of the mould assembly.
Figure 11:
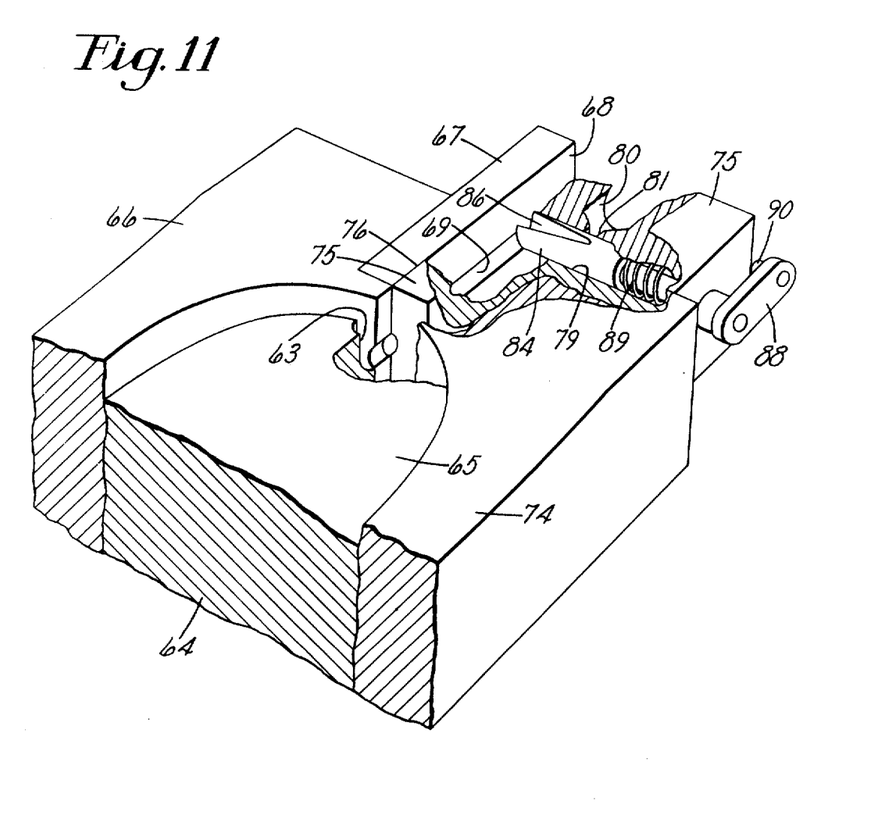
FIG. 11 is a perspective view of the valve member shown in FIG. 10.

Each mould station comprises a housing 52 (FIG. 2) having an upstanding frame 54 provided with two spaced rails 56 (only one shown in FIG. 2). Mounted on the housing 52 is a mould assembly 60 having a base plate 62 (see also FIG. 6) on which is mounted a sole mould member 64. Slidably mounted on the base plate 62 on either side of the sole mould member are two side mould members 66, 74 (FIGS. 10 and 11). Mould closing mechanisms 61, including toggle mechanisms and hydraulic piston/cylinder devices are provided to move the side mould members across the base plate 62 relative to the sole mould member 64 between open and closed positions. In their closed positions, the mould members provide a mould cavity the form of a shoe bottom unit.

Slidably mounted for heightwise movement between the two rails 56 is a carrier block 96 (FIG. 2) on which is rotatably mounted a foot form assembly 97. The foot form assembly includes two opposed foot forms 98 and a locking member (not shown) whereby either one of the foot forms may be located in a position in which the bottom of the foot form is positioned opposite the sole mould cavity. Another mould closing mechanism, (not shown), provided by toggle mechanisms, cam members and hydraulic piston/cylinder devices acts to move the carrier block 96 on the two rails towards and away from the sole mould members. Each mould station also includes a control mechanism (not shown) comprising a manually operated starter, selection means, a timing device and a timer control switch. Operation of the starter causes the mould closing mechanism 61 to close the side mould members 66, 74 and to move the carrier block 96 to its lower position in a sequence determined by the condition of the selection means. When the selection means is in one condition, the machine operates in a side-closing sequence in which the mould members 66 and 74 are moved to their closed positions prior to movement of the foot form from its retracted to its advanced position. When the selection means is in a second condition, the machine operates in a top-closing sequence in which the moulds 66, 74 are closed after the foot form is moved down.

Referring particularly to FIGS. 10 and 11, it may be seen that the side mould member 66 carries a block 67 having a sprue groove 69 in an engagement surface 68 of the block. The side mould member 74 also carries a block 75 having a sprue groove 77 in an engagement surface 76. A cross-bore 79 in the block 75 intercepts the groove 77 and extends tranversely to the engagement surface 76. Extending into the block 75 through a front surface and connecting with the cross-bore 79 is an inlet passage 81 having an enlarged counterbore 80. When the side mould members are in their closed positions, the surfaces 68 and 76 are engaged and the sprue grooves 69 and 77 together with a short transverse bore 63 in an outer surface of the sole mould member 64 form a sprue bore which enters the mould cavity at the toe portion through a tread moulding surface 65 of the mould member 64. A rotary valve member 84 is received in the cross-bore 79 and has a stem which extends through a portion 78 of the cross-bore. An operating member 88 is secured to an outer end of the stem. A spring 89 in the cross-bore urges the valve member against the surface 68 with the operating member 88 against one end of the block 75. The valve member 84 is provided with a tapered groove 86 having its narrow end adjacent the inlet passage 81 and its wider open end adjacent the sprue grooves 77, 69. The valve is shown in closed condition in FIGS. 10 and 11. When the valve is rotated 90° to the full line position of member 88 in FIG. 9, the groove 86 faces the inlet passage 81 and provides an intermediate passage extending from the inlet passage to the sprue bore leading into the mould cavity. For a purpose which will presently appear, each side mould member 66 is provided with a holder 71 (FIG. 4) extending from a toe portion thereof. Secured to the holder 71 is a rod-like control or signal member 72 having a length which is proportional to the capacity of the mould cavity provided by its associated mould assembly when closed by a shoe upper assembly mounted on one of the foot forms of the foot form assembly.

Figure 12:
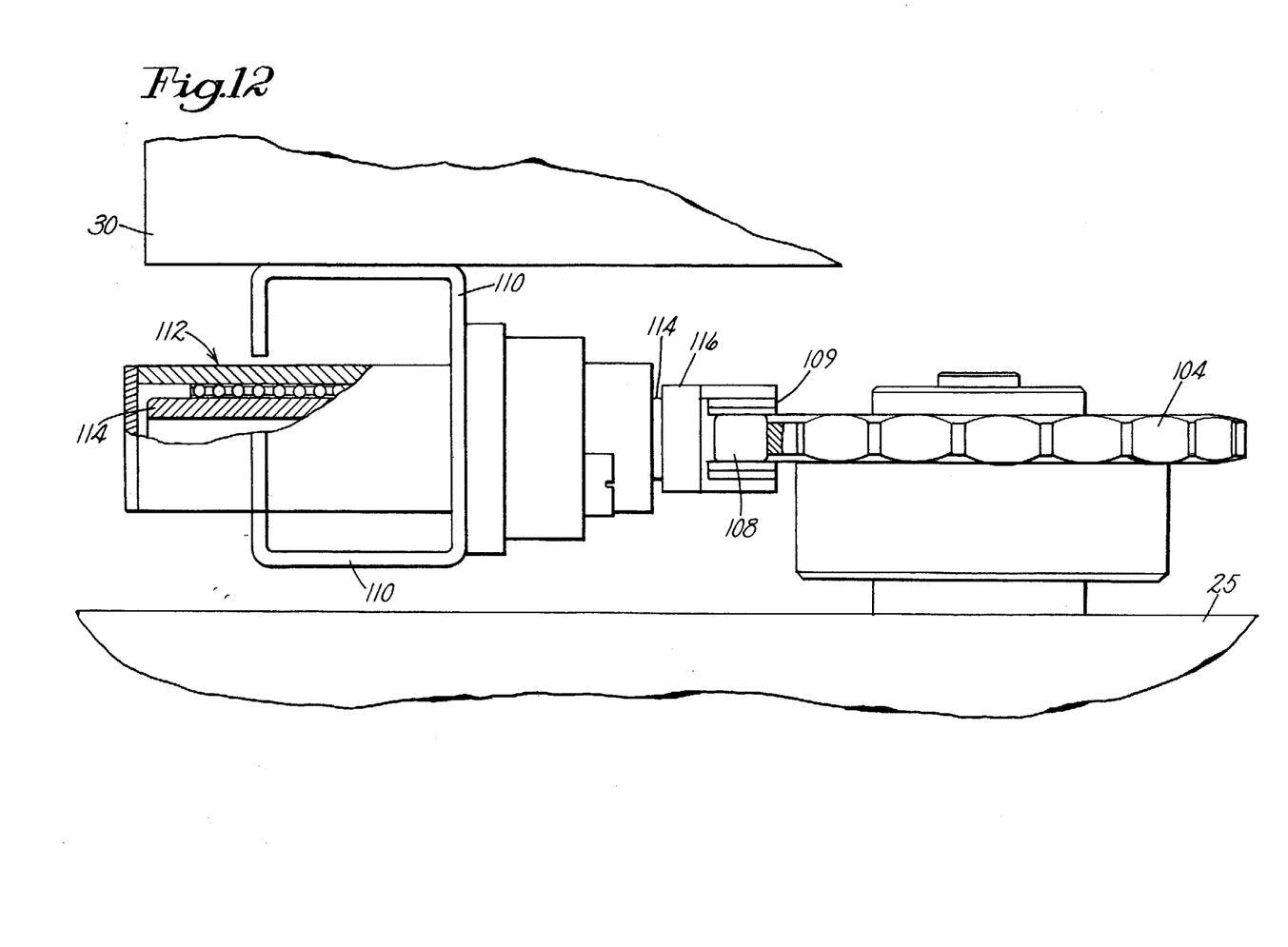
FIG. 12 is a sectional view of driving mechanism of the illustrative machine.

The machine is provided with a center housing 20 (FIGS. 1 and 2) having a vertical shaft 22 providing a center axis for the injection mechanism 150. A plurality of struts 25 extend radially from the center housing and are covered by plates 26. A plurality of rails 27 extend between adjacent struts circumferentially to the center axis to provide a continuous track subtending an angle of about 130° around the center axis. A carriage 30 (FIGS. 1 and 2) is mounted for turning movement on the shaft 22 and has two wheels 35 which roll on the continuous track formed by the rails 27. The carriage is provided with rails 34 on which rolls a trolley 38 having two pair of forward wheels 39 and two pair of rearward wheels 40. A cylinder 43 fixed to the carriage has a piston rod 44 secured to a rear end portion of the trolley to move the trolley in radial directions. Secured to the underside of the outer end of the carriage 30 is a bracket 110 (see FIG. 12) which carries a linear bearing 112 having an inwardly extending rod 114 connected through a head 116 to a link 109 of a chain 108. The chain is carried on a plurality of sprockets 104 mounted on the struts 25 and is driven by a motor, not shown. Movement of the chain drives the carriage from station to station along the continuous track about the center axis.

At the start of the machine operation, the carriage 30 is located at the first of the twelve stations as seen in FIG. 1 with the injection mechanism 150 on its trolley 38 in a retracted position. The operator mounts a lasted shoe upper assembly on the upper foot form 98 at each station and rotates the form into operative relation with its associated mould assembly 60. The operator then starts the machine, causing the mould member 66, 74 to close and the foot form to be moved down into engagement with the mould members. The cylinder 43 operates to move the trolley radially outward on the carriage 30 to engage the injection mechanism 150 with the mould assembly of the first station. During final movement, a positioning member 15 of the trolley moves between two rollers 31 (FIGS. 1 and 2) mounted on the carriage to align the trolley and carriage, and then between two further rollers 53 mounted on the housing 52 of the first station to guide a nozzle 152 of the injection mechanism into the counter-bore 80 of the mould assembly.

The injection mechanism operates, as will presently appear, at least partially to fill the mould cavity with the bottoming material and after a predetermined interval the cylinder 43 is again operated to retract the trolley 38 and its injection mechanism 150 to its initial position. The chain 108 is then driven to move the carriage 30 in a counterclockwise direction, as seen in FIG. 1, until a sensing member on the carriage engages a sensing device 58 (FIG. 2) at the second mould station. The control mechanism of the machine stops the chain drive and causes bottoming material to be injected into the second mould assembly, as above described with reference to the first station. After retraction of the injection mechanism 150, the chain 108 is again driven and the carriage is moved in a step-by-step manner to successive stations. On arrival of the carriage at the twelfth or last station, a sensing device (not shown) preconditions the control mechanism to reverse the motion of the chain 108 and the carriage is driven in a clockwise direction as seen in FIG. 1, until the carriage is returned to the first station.

Figure 3:
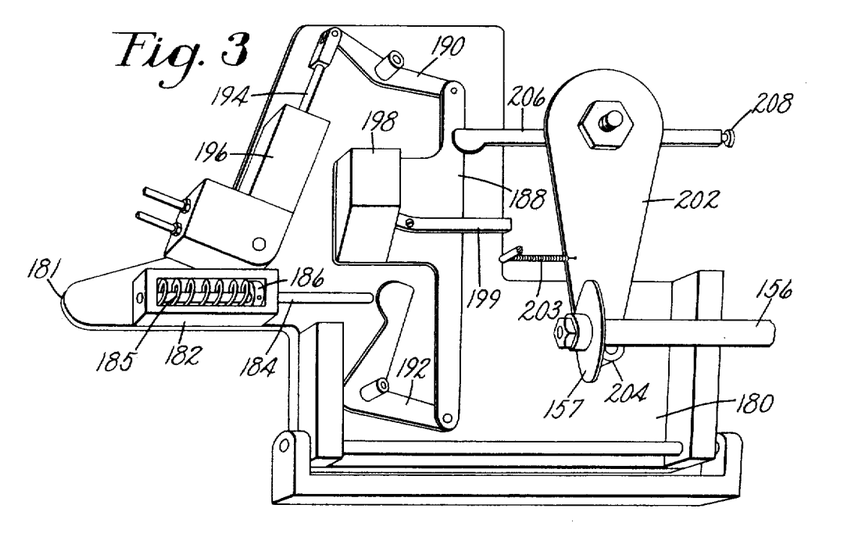
FIG. 3 is a schematic view of injection volume control means of the illustrative machine.
Figure 4:
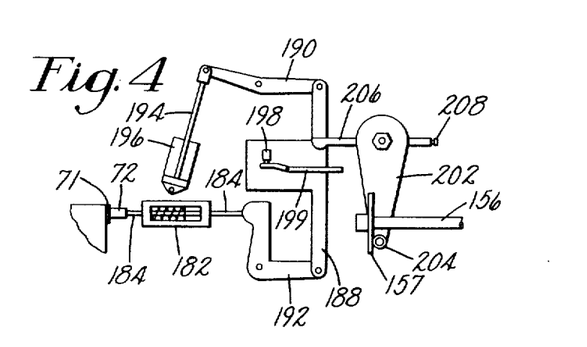
FIG. 4 is a diagrammatic view showing the control means of FIG. 3 cooperating with a signal member of a mould assembly of one of the mould stations.
Figure 5:
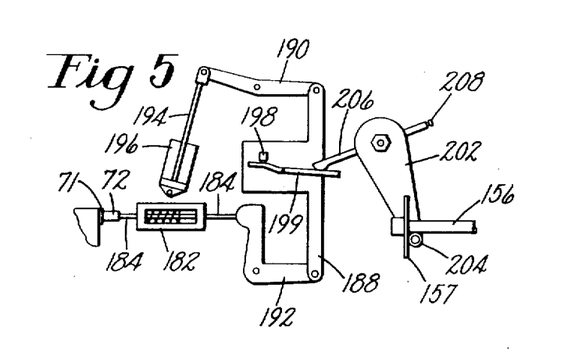
FIG. 5 is a view similar to FIG. 4 but showing the positions of various parts after partial operation of an injection mechanism of the machine.
Figure 7:
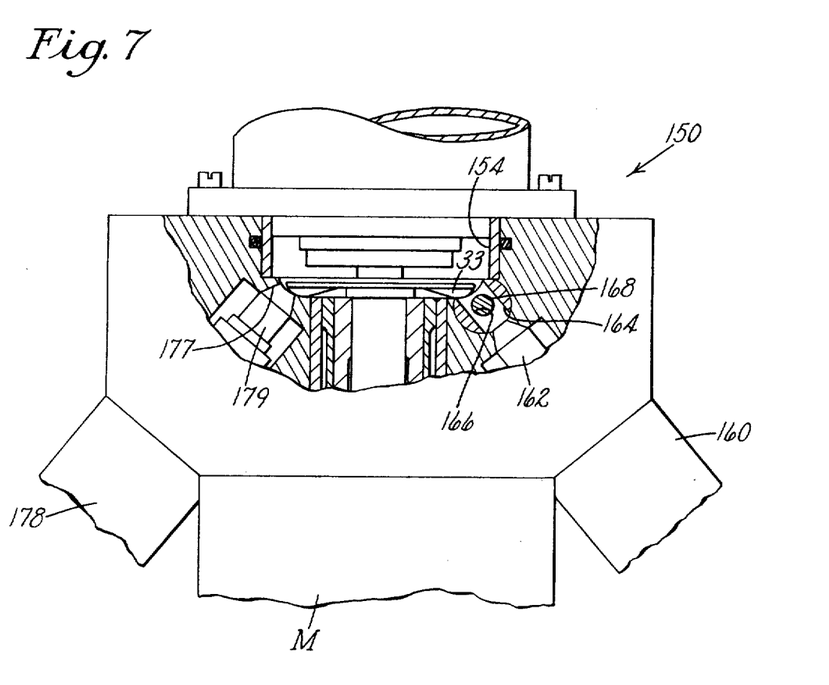
FIG. 7 is a view, partly in section, of a mixing chamber of the injection mechanism.
Figure 8:
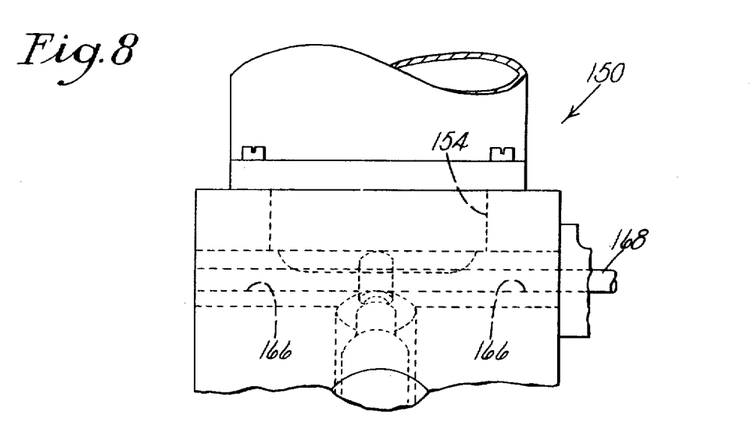
FIG. 8 is a side view of the mixing chamber shown in FIG. 7.

The injection mechanism 150 is adapted to mix together constituent compositions in a desired ratio and to inject the mixed constituent compositions from the outlet nozzle 152. In a cycle of operation of the injection mechanism, a feed operating device (not shown) is moved by a movable member comprising a piston rod 156, a remote end of which is shown in FIGS. 3 – 5, from a rest position in a first direction to feed a first constituent composition from a first feeding device into a mixing chamber 154 (FIGS. 7 and 8). The feed operating device is then moved in a second, reverse direction and a second constituent composition is fed into the mixing chamber 154. The constituent compositions are mixed in the mixing chamber and dispensed therefrom through the outlet nozzle 152. The feed operating device then causes a small movement of the piston rod 156 in said first direction to said rest position to feed a small amount of first constituent composition to the mixing chamber to dilute mixed constituent composition remaining in the mixing chamber 154 to prevent curing of the mixed composition. Adjustment of the ratio of the constituent compositions fed to the mixing chamber may be made without having substantial affect on the total quantity of constituent composition fed to the mixing chamber and dispensed from the outlet orifice, the total quantity being dependent on the amount of movement of the piston rod 156. The composition feeding and mixing device of the injection mechanism forms no part of the present invention and will not be described further herein except to note that a typical ratio/mixing device suitable for use in the present machine is described in U.S. application Ser. No. 863,819 filed Oct. 6, 1969.

Figure 9:
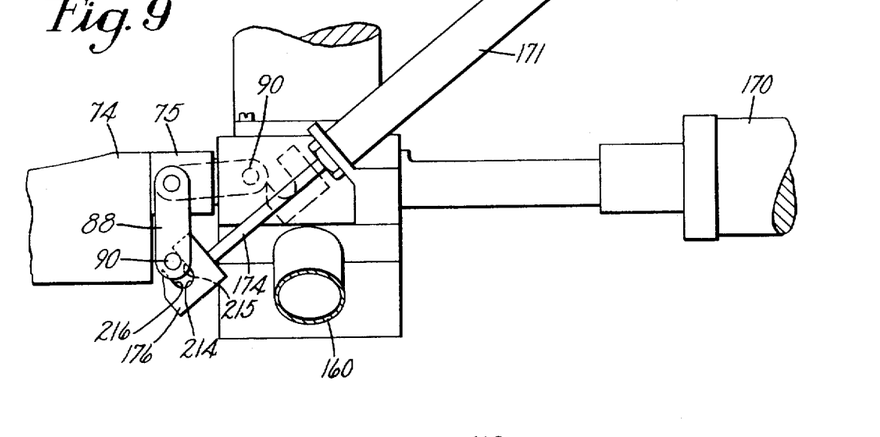
FIG. 9 is a side view, similar to that shown in FIG. 8, also showing valve operating means of the injection mechanism.

One of the constituent compositions is fed to the mixing chamber 154 from a conduit 158 (FIG. 2) through a valve 160 (FIGS. 7 and 8) having a valve member 162 adapted to close an inlet passage 164 leading to the chamber. The other constituent composition is fed to the chamber 154 through a valve 178 having a valve member 179 closing a passage 177 also leading to the chamber. A stirring device 33 is rotated by a motor M to mix the compositions before they are injected into the mould cavity. After mixing, the compositions are fed from the mixing chamber 154 through the passage 164 and along a cross passage 166 which leads through the injection nozzle 152. The passage 166 receives a close fitting rod 168 which extends from a cylinder 170 (FIG. 6) through the passage 164 and entirely through the passage 166 to the nozzle 152 to close off the nozzle when the constituent components are first fed to the mixing chamber 154. To permit injection of the mixed components along passage 166, the valves 160, 178 are closed and the cylinder 170 is operated to retract the rod 168. A piston mounted in the mixing chamber is driven down at this time to force the mixed components through the nozzle 152, groove 86 in the valve 84, along the sprue bore 69, 77 and 63 into the mould cavity to form a shoe bottom on the shoe upper assembly on the form 98. At this time, the valve member 84 is rotated 90° from the position shown in FIGS. 10 and 11 where the injection inlet 81 is closed to the position shown in FIG. 6 in which the groove 86 of the valve provides a passage between the inlet and the sprue bore. To this end, the valve-operating member 88 (FIG. 9) is provided with a roll 90 adapted to be received in a slot 214 of a hook-shaped member 176. The member is mounted on a piston rod 174 extending from a cylinder 171. To open the valve 84, the cylinder is operated, moving the rod 174 to the left as seen in FIG. 9. An inside face 215 of the member 176 engages the roll 90 (which is in the broken line position) and swings the member 88 down to the full line position.

As above described, each mould assembly is provided with a signal member 72 (FIGS. 4 and 5) having a specific length which is proportional to the capacity of the mould cavity. This signal member is used to control the quantity of material fed to the injection mechanism and injected into the mould cavity. To this end the injection mechanism is provided with a control unit carried by a frame 180 (FIG. 3) mounted on a side portion of the injection mechanism. A housing 182 secured to the frame has mounted therein a control rod 184 with a spring 185 acting between the housing 182 and a stop 186 to urge the rod to the right as seen in FIG. 3. An assembly 188 is pivoted at its upper end to one arm of a lever 190 and at a lower end to one arm of a bellcrank 192. The other arm of the lever 190 is connected to a rod 194 of a cylinder 196. Mounted on a central portion of the assembly 188 is a control device comprising a switch 198 operated by a lever 199. In a rest condition of the control means, the piston rod 194 is retracted, moving the assembly 188 up and the control rod 184 to the left of the housing 182 through the upstanding arm of the bellcrank 192 and against the action of the spring 185. A leading nose portion of the frame 180 adjacent the housing 182 provides a stop 181 which engages the mould assembly to limit movement of the injection mechanism. Pivotally mounted on the injection mechanism 150 is a member 202, urged by a spring 203 secured to the frame 180 in a clockwise direction as seen in FIG. 3. Extending through the pivot of the member 202 and secured to said member is an actuator comprising a control arm 206. A lower portion of the member 202 is provided with a roller 204 which engages a flange 157 secured to the end portion of the rod 156 opposite that end portion which is secured to the correlating bar (associated with the component feeding mechanism), engagement of the roller 204 with the flange 157 limiting clockwise movement of the member 202. On operation of the component feeding device, movement of the piston rod 156 to move the correlating bar in its first direction corresponds to movement to the right, as shown in FIG. 3. The member 202 is thus moved in an anticlockwise direction, swinging the control arm 206 down and engaging the lever 199 to operate the switch 198 as may be seen by a comparison of FIGS. 4 and 5. Operation of the control switch causes the piston rod 156 to stop its movement in said first direction and to start movement in the opposite direction to cause the correlating bar to move in its said second direction to feed the second composition to the mixing chamber 154. The injection mechanism also includes density control means comprising an adjustment device 208 adapted to alter the length of extension of the control arm 206 to the left from the pivot of the member 202. Adjustment of the device 208 varies the ratio-volume of the constituent parts of the mix to vary the density of the foamed polyurethane injected onto the shoe bottom.

During the final outward movement of the trolley 38 to engage the injection nozzle 152 with the inlet of the mould assembly, the control rod 184 engages the mould capacity control or signal member 72 as seen in FIGS. 4 and 5. The rod 184 at this time is in an extended position as caused by retraction of piston rod 194 into the cylinder 196. The assembly 188 also is in its uppermost position. Continued movement of the injection mechanism causes the control rod 184 to be moved back relative to the frame 180 until the stop portion 181 of the frame engages the mould assembly. Movement of the rod 184 through the bellcrank 192 moves the assembly 188 down until the space between the arm 206 and the switch lever 199 is commensurate with the volume of material to be injected. The space between the switch lever 199 and the control arm 206 is thus dependent upon the amount of forward movement of the trolley 38 after engagement between the control rod 184 and the signal member 72, and is thus controlled by the length of the signal member 72. The rod 156 is moved to the right as seen in FIG. 3 while the first constituent component is fed. This swings the arm 206 down from the position seen in FIG. 4 until it engages the lever 199 (as seen in FIG. 5), actuating switch 198. The amount of movement of the rod 156 while the first component is fed until engagement between the arm 206 and the lever 199 and actuation of switch 198 depends not only on the space between the arm and the lever (as determined by the length of the signal member 72) but also upon the length of extension of the arm 206 from its pivot as adjusted by device 208. The greater this extension, the smaller will be the angular movement of the arm 206, and hence the smaller will be the movement of the rod 156 and feed of the first component before actuation of switch 198. On actuation of switch 198, the valve 160 (FIG. 7) is closed, the valve 178 is opened and the movement of rod 156 and the correlating bar are reversed to feed the second composition into the mixing chamber until another control switch (not shown) is actuated closing valve 178 and stopping movement of rod 156.

The first and second constituent compositions fed to the mixing chamber 154 are mixed therein. The cylinder 170 (FIGS. 6 and 9) is then operated to retract the rod 168 to open the cross passageway 166 leading to the injection nozzle 152. A piston mounted in the mixing chamber is lowered to force mixed constituent composition from the mixing chamber 154 along the passageways 164, 166 and from the outlet nozzle 152 through the inlet orifice 81 of the mould assembly. The mixed constituent composition is forced through the groove 86 of the valve member 84, and along the sprue bore 69, 77 and 63 into the mould cavity. Thereafter, the cylinder 170 is operated to move the rod 168 along the length of the cross passageway 166 to force residual mixed constituent composition therein through the inlet passage 81 and into the cross bore 79. The valve operating cylinder 171 is then actuated, moving the rod 174 and member 176 to the right to the position shown in dashed line in FIG. 9. During such movement, an inside face 216 of the slot 214 engages the roller 90 of the operating member 88 and moves the operating member in a counterclockwise direction to rotate the valve member 84 to its closed position. The valve member in its rotation rubs on the end of the rod 168 scouring adhering material from the leading face of the rod. The valve 160 (FIG. 7) of the mixing chamber is opened and the correlating bar is moved by the rod 156 of the operating device to its rest position. A small quantity of first constituent composition is thus fed through the inlet passageway 164 washing mixed constituent composition therefrom into the mixing chamber, diluting mixed constituent composition remaining in the mixing chamber and preventing reaction thereof. The mixed constituent compositions in the cross bore, the sprue bore and the mould cavity react and expand. Air is swept from the bottom of the lasted shoe upper assembly by the advancing front of the moulding material and is forced through a vent to atmosphere. At this time the cylinder 43 is operated to retract the trolley 38 and injection mechanism 150 from the mould assembly. After a pre-set time interval, the side mould members are moved to their open positions and the carrier block 96 with its mould form is moved up to its remote position. On movement of the side mould members to their open positions, a solid sprue, comprising material from the sprue bore, and material from the cross bore 79, remains attached to a shoe bottom of polyurethane foam moulded on to the shoe upper assembly mounted on said foot form of the mould assembly of the first station. The above described machine cycle is repeated with the injection mechanism moving from station to station to apply moulded shoe bottoms to the lasted upper assemblies at successive stations.

Having thus described our invention, what is claimed as novel and desired to be secured by Letters Patent of the United States is:

1. Apparatus for moulding articles of plastic material including a mould having a shaped cavity in which articles are to be formed, a control member associated with said mould and having a dimensional characteristic proportionally related to the volume of said cavity, a mechanism for injecting said material into said cavity to form an article, means for causing relative engaging movement between said mould and said mechanism before said material is injected into the mould cavity, and a control unit for varying the volume of material injected by said mechanism, said control unit being actuated by said control member during said relative engagement movement and to an extent determined by said characteristic whereby the volume of said material injected into said cavity is predetermined according to the volume capacity of the cavity.

2. Apparatus according to claim 1 in which the control member has a length dimension proportional to the volume of the cavity.

3. Apparatus according to claim 1 in which the control unit which varies the volume of the material injected according to the control effected by the control member is adjustable to further vary said volume apart from the control exercised by said control member.

4. Apparatus according to claim 1 in which the injecting mechanism includes a movable member which determines the volume of material injected and the control member limits the movement of said member.

5. Apparatus according to claim 4 and also including an actuator movable proportionally with movement of said movable member, a control device operated after movement of said actuator through a variable space for limiting the extent of movement of said movable member, and means controlled by said control member for varying said space according to the cavity volume indicated by said control member.

6. Apparatus according to claim 5 in which the control exercised by the control member is adapted to cause a volume of material less than the volume of said cavity to be injected, said material being of the type which expands to fill said cavity and form an article of predetermined density, said actuator being adjustable to vary the volume of said material injected to vary said density.

7. Apparatus for moulding articles of plastic material including a plurality of moulds each having a shaped cavity in which said articles are to be formed, a plurality of control members each associated with an individual mould and having a dimensional characteristic proportionally related to the volume of the cavity of the associated mould, a mechanism for injecting said material into each cavity to form a plurality of articles successively, means for causing relative movement between said moulds and said mechanism for causing said mechanism to be engaged successively with each mould, and a control unit for varying the volume of material injected by said mechanism, said control unit being actuated by said control member during said relative movement and to an extent determined by said characteristic whereby the volume of said material injected into each mould cavity is predetermined according to the volume capacity of said each cavity.

8. Apparatus according to claim 7 in which the control unit which predetermines the volume of material injected according to the control exercised by the control members is adjustable to further vary said volume apart from the control exercised by each control member.

* * * * *